May 1, 1934.　　　　C. E. CARPENTER　　　　1,956,853
DOUGHNUT MACHINE AND THE LIKE
Filed May 19, 1932
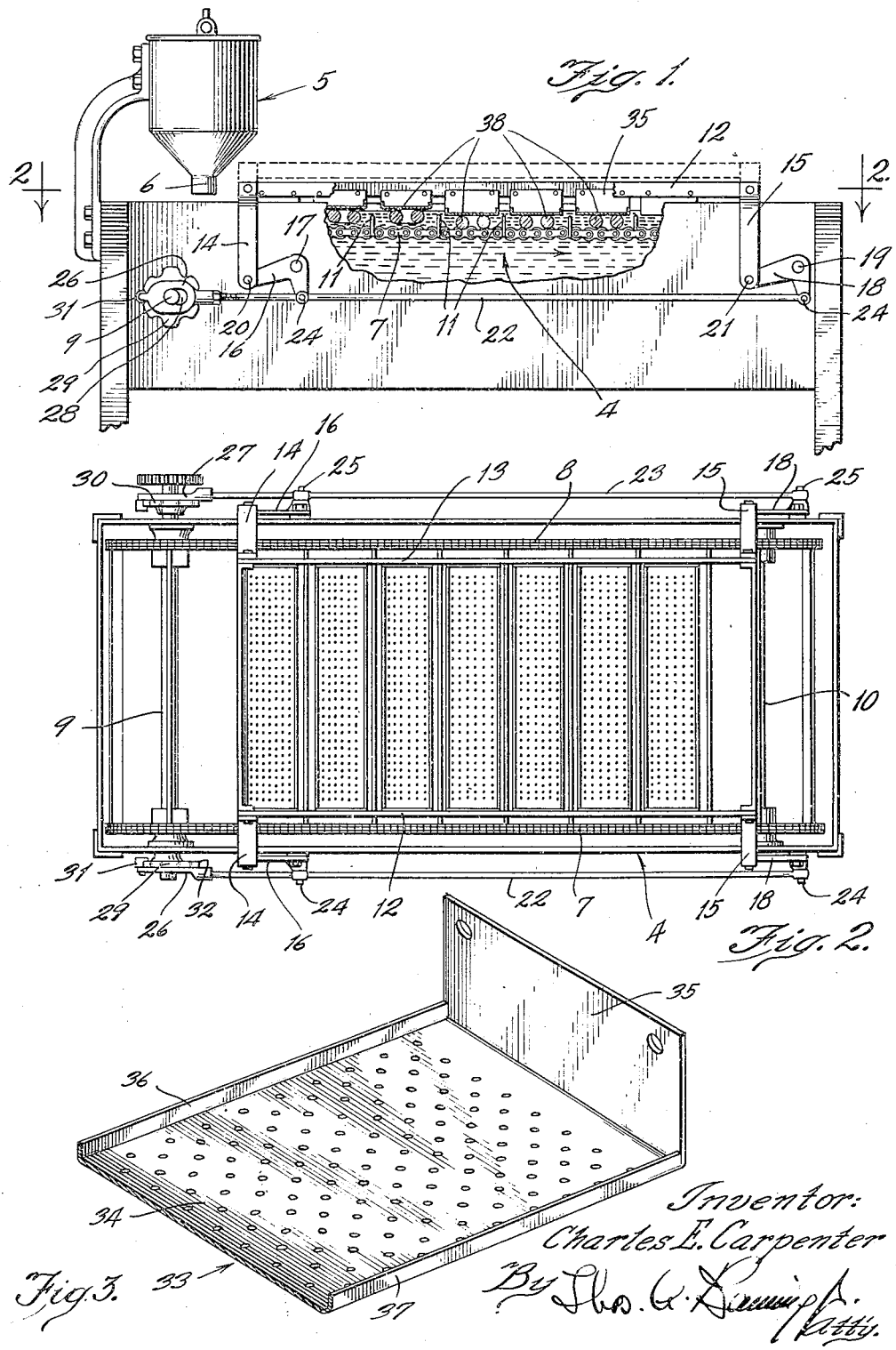
Inventor:
Charles E. Carpenter Patented May 1, 1934

1,956,853

UNITED STATES PATENT OFFICE 1,956,853

DOUGHNUT MACHINE AND THE LIKE

Charles E. Carpenter, Chicago, Ill.

Application May 19, 1932, Serial No. 612,250

12 Claims. (Cl. 53—7)

This invention has to do with certain improvements in doughnut machines and the like. The features herein disclosed relate particularly to improvements in the means for ensuring a proper cooking or frying operation after the doughnuts have been formed and delivered into the frying pan.

One feature of the present invention relates to the provision of means for frying the doughnuts uniformly on both sides without the necessity of actually turning over the doughnuts during the frying operation. In this connection it is an object to provide an arrangement such that the doughnuts are submerged in the hot grease and at the same time the arrangement is such that the doughnuts do not become soggy or permeated with the grease during the frying operation.

Another feature of the invention relates to the provision of an arrangement for submerging the doughnuts in the hot grease and simultaneously advancing them during the frying operation, while at the same time making provision for permitting the doughnuts to be properly advanced along the frying pan without interference from the submerging device.

Another feature of the invention relates to the provision of an arrangement such that the doughnuts are periodically submerged and then allowed to rise in the hot grease so that the frying operation is caused to proceed in proper fashion and at the same time the tendency to soak up the grease into the doughnuts is eliminated.

In connection with the foregoing it is a further object to provide an arrangement whereby when the doughnuts are permitted to rise to the surface of the grease they are at the same time sprinkled or sprayed with hot grease so that they are sufficiently fried on their top or exposed portions, thus ensuring a uniform frying operation for the entire doughnut.

Other objects and uses of the invention will appear from a detailed description of the same which consists in the features of construction and combinations of parts hereinafter described and claimed.

In the drawing:

Figure 1 shows a side elevational view of a machine embodying the features of the present invention, a portion of the side wall being broken away so as to reveal the interior construction;

Figure 2 shows a plan view corresponding to Figure 1; and

Figure 3 shows a perspective view of one of the trays.

In Figures 1 and 2 the frying pan is designated in its entirety by the numeral 4. It is of familiar construction and is heated in any convenient manner. Located above one end of the pan is a dough hopper 5 of convenient construction, the same having a downwardly extending throat 6 through which the formed doughnuts are delivered into the pan.

Located within the pan is a conveyor including a pair of side chains 7 and 8 passing over sprockets on the end shafts 9 and 10 in the usual manner. The conveyor chains are provided with outwardly extending flights 11 so that as the top runs of the chains travel in the direction of the arrow in Figure 1 the doughnuts are carried from the position of the doughnut former 5 to a suitable discharge point.

Extending along above the upper side portions of the pan 4 are the horizontal bars 12 and 13. These bars are supported by links 14 at the hopper end of the machine and by links 15 at the delivery end of the machine. Bell cranks 16 are pivotally connected to the side walls of the pan on the pins 19 adjacent to the delivery end of the machine. The bell cranks 16 are connected to the lower ends of the links 14 by pins 20 and the bell cranks 18 are connected to the lower ends of the links 15 by pins 21.

Links 22 and 23 extend along adjacent to the sides of the pan 4; the link 22 being pivotally connected to the adjacent bell cranks 16 and 18 by the pins 24 and the link 23 being pivotally connected to the adjacent bell cranks 16 and 18 by the pins 25. Manifestly the back and forth movements of the links 22 and 23 are accompanied by simultaneous lifting of the bars 12 and 13.

The ends of the links 22 and 23 are provided with heads 26 and 27 respectively. These heads are slotted as shown at 28 in Figure 1 to receive the shaft 9. Cam blocks 29 and 30 are placed on the shaft 9 adjacent to the heads 26 and 27; and the heads 26 and 27 are provided with rollers 31 and 32 working against the opposite faces of the cam blocks. The arrangement is such that as the shaft 9 rotates the links 22 and 23 are periodically reciprocated back and forth, thus raising and lowering the bars 12 and 13 in timed relationship with respect to the advancements of the conveyor chains 7 and 8.

The proportions are such that the conveyor chains advance the distance between consecutive flights 11 for each intermediate movement.

Trays 33 such as shown in Figure 3 are carried by the bars 12 and 13. Each of these trays includes a central or body portion 34 which is provided with numerous perforations and is also provided with end flanges 35. The end flanges are connected to the bars 12 and 13 respectively. Each tray is also provided with side flanges 36 and 37. Thus each tray constitutes in effect a shallow pan which when lowered into hot liquid grease becomes partially filled with the same and when the tray is raised the hot liquid grease is allowed to run out in the form of a large number of small streams and thus descend in the form of a spray onto the doughnuts beneath it.

The proportions are such that the conveyor is stationary the bars 12 and 13 will be lowered and the trays will occupy positions between the consecutive flights 11 as shown in Figure 1. When the advancing operation commences the bars 12 and 13 are raised so as to raise the trays and immediately thereafter the chains are advanced so as to advance the flights and the doughnuts 38 which are located between the flights.

Furthermore as shown in Figure 1 certain of the trays located closest to the position of the doughnut forming mechanism do not descend quite as far into the grease as the trays which are more distantly removed from the doughnut former. Consequently as the bars 12 and 13 are lowered those doughnuts which have been most recently dropped into the hot grease will not submerge as far as the doughnuts which have been previously dropped into the hot grease. As the doughnuts progress through the pan they are subjected to a progressive amount of submergence in the grease, with consequent increase of cooking action, which may in some cases be desirable in order to ensure a doughnut which is cooked to the most even condition. Each time the trays are raised all of the doughnuts are allowed to raise due to their natural buoyancy and their top and exposed portions are sprinkled with molten hot grease from the trays.

Suitable connections may be provided between the conveyor mechanism and the doughnut former for operating all of these parts in timed relationship. Also if desired suitable delivery mechanism may be provided for causing the finished doughnuts to be delivered from the tray 4.

While I have herein shown and described only a single embodiment of my present invention still I do not intend to limit myself thereto except as I may do so in the claims.

The perforations in the trays permit the air and gases from the frying doughnuts to rise freely and without obstruction so that the natural cooking operation is not interfered with by the presence of these trays.

I claim:

1. In a machine of the class described the combination of a frying pan, means for forming and delivering dough batches into said frying pan at one position, means for advancing said dough batches through the frying pan to another position comprising a horizontally movable conveyor having a series of vertically extending separated flights movable through the conveyor, together with means for submerging dough batches at positions between the flights comprising vertically movable perforated pans located between the flights, and means for moving said pans vertically in harmony with the conveyor movements substantially as described.

2. In a machine of the class described the combination of a frying pan, means for advancing frying doughnuts therethrough comprising a horizontally movable conveyor having a series of vertical flights separated from each other in the direction of conveyor movement, a series of perforated pans located above the conveyor at positions between the flight positions, and means for moving said pans vertically in synchronism with the conveyor movements, said means being so constituted that certain of the pans move to lower positions than other pans, substantially as described.

3. In a machine of the class described the combination of a frying pan, means for advancing frying doughnuts through said pan including a series of intermittently movable equally spaced vertical flights, perforated pans located at positions between the rest positions of said flights, and means for intermittently raising and lowering said pans in harmony with the intermittent advancement of the flights, certain of the pans descending to lower positions than the other pans, substantially as described.

4. In a machine of the class described the combination of a frying pan, means for advancing frying doughnuts through said pan including a series of intermittently movable equally spaced vertical flights, perforated pans located at positions between the rest positions of said flights, and means for intermittently raising and lowering said pans in harmony with the intermittent advancement of the flights, substantially as described.

5. In a machine of the class described the combination of a frying pan, means for intermittently advancing doughnuts through said pan including a series of separated vertical flights, and means for periodically submerging doughnuts at position between said flights comprising a series of vertically movable perforated pans located at positions between the rest positions of the flights, and means for lowering said pans between the flights, substantially as described.

6. In a machine of the class described the combination of a frying pan, means for advancing frying doughnuts through the pan including a series of uniformly separated vertical flights, and means for submerging doughnuts between said flights comprising vertically movable members spaced harmoniously with respect to the flights, and means for moving said members downwardly between the flights to thereby submerge the doughnuts, certain of said members descending to lower positions than others of said members, substantially as described.

7. In a machine of the class described the combination of a frying pan, means for advancing frying doughnuts through the pan including a series of uniformly separated vertical flights, and means for submerging doughnuts between said flights comprising vertically movable members spaced harmoniously with respect to the flights, and means for moving said members downwardly between the flights to thereby submerge the doughnuts, substantially as described.

8. In a machine of the class described the combination of a frying pan, means for advancing frying doughnuts through said pan including a series of vertically extending flights, and means for intermittently submerging and spraying the drying doughnuts comprising a series of perforated pans movable vertically into the pan at positions between the flights to thereby submerge the doughnuts and scoop up liquid grease, said grease running out of said pans when said pans are thereafter raised, substantially as described.

9. In a machine of the class described the combination of a frying pan, means for advancing frying doughnuts through said pan, and means for intermittently submerging doughnuts into the pan and for spraying said doughnuts between the submerging operations, said means comprising a series of perforated vertically movable pans located in vertical alignment with doughnut positions, certain of said pans descending to lower positions than others of said pans, substantially as described.

10. In a machine of the class described the combination of a frying pan, means for advancing frying doughnuts through said pan, and means for intermittently submerging doughnuts into the pan and for spraying said doughnuts between the submerging operations, said means comprising a series of perforated vertically movable pans located in vertical alignment with doughnut positions, substantially as described.

11. In a machine of the class described the combination of a frying pan, means for intermittently advancing doughnuts through said pan, and means for intermittently submerging the doughnuts into the pan, and for spraying the doughnuts between the submerging operations, substantially as described.

12. In a machine of the class described the combination of a frying pan, and means for intermittently submerging doughnuts into said pan, and spraying the doughnuts with hot grease between the submerging operations, substantially as described.

CHARLES E. CARPENTER.